(12) United States Patent
Hedberg

(10) Patent No.: US 8,213,944 B2
(45) Date of Patent: Jul. 3, 2012

(54) METHOD FOR MOBILE COMMUNICATIONS, A MOBILE COMMUNICATION DEVICE AND A NODE IN A MOBILE COMMUNICATIONS NETWORK FOR REDUCING THE CALL SETUP DELAY

(75) Inventor: Tomas Hedberg, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 405 days.

(21) Appl. No.: 12/161,654

(22) PCT Filed: Jan. 20, 2006

(86) PCT No.: PCT/SE2006/000084
§ 371 (c)(1),
(2), (4) Date: Mar. 25, 2010

(87) PCT Pub. No.: WO2007/084032
PCT Pub. Date: Jul. 26, 2007

(65) Prior Publication Data
US 2010/0184426 A1   Jul. 22, 2010

(51) Int. Cl.
*H04W 24/00* (2009.01)
(52) U.S. Cl. ............. 455/450; 455/425; 455/422.1; 455/453; 455/436; 455/440; 370/331; 370/252

(58) Field of Classification Search ............... 455/450, 455/425, 422.1, 453, 436, 440; 370/331, 370/252
See application file for complete search history.

(56) References Cited

U.S. PATENT DOCUMENTS

| | | | |
|---|---|---|---|
| 2003/0035393 A1* | 2/2003 | Sinnarajah et al. | 370/335 |
| 2004/0110511 A1* | 6/2004 | Schmidt et al. | 455/450 |

FOREIGN PATENT DOCUMENTS

| | | |
|---|---|---|
| EP | 0964595 A2 | 12/1999 |
| WO | WO 98/56203 | 12/1998 |
| WO | WO 02/32179 | 4/2002 |

* cited by examiner

*Primary Examiner* — Marivelisse Santiago Cordero
*Assistant Examiner* — Jean Chang
(74) *Attorney, Agent, or Firm* — Roger S. Burleigh

(57) ABSTRACT

The invention relates to a method for a mobile communications, a mobile communication device (1), a node (N1, N2) in a mobile communications network (RAN, CN). The method comprises the step of sending a service request (307) from a mobile communication device (1) to a mobile communications network (RAN, CN), and in the method, the following steps are carried out before sending the service request (307): detecting an activity (301) related to the mobile communication device (1), and performing (304), in response to the detection (301) of the activity, at least one measurement of at least one candidate for serving a communication session.

16 Claims, 3 Drawing Sheets

METHOD FOR MOBILE COMMUNICATIONS, A MOBILE COMMUNICATION DEVICE AND A NODE IN A MOBILE COMMUNICATIONS NETWORK FOR REDUCING THE CALL SETUP DELAY

TECHNICAL FIELD

The present invention relates to a method for a mobile communications, comprising the step of sending a service request from a mobile communication device to a mobile communications network, and also to a mobile communication device and a node in a mobile communications network.

BACKGROUND

Generally, a mobile terminal is adapted to make relatively infrequent measurements in an idle mode or on common channels and frequent measurements on dedicated channels. In the standards UTRAN (Universal Terrestrial Radio Access Network) and GPRS (General Packet Radio Service), frequent measurements on dedicated channels are only started on explicit order from the network. In said standards, broadcast information in an idle mode gives the mobile terminal information on a set of radio access technologies (RATs) and cells. In a connected mode the broadcasted set may be replaced by mobile-specific orders from the network.

There are several proposed solutions for managing radio resources in mobile communication systems, see e.g. WO02/032179 or EP0964595A2. Operators having several Radio Networks, such as GSM (Global System for Mobile communication) and WCDMA (Wideband Code Division Multiple Access) providing coverage in the same area, seek to control the traffic between the radio networks based on load and service. Typical objectives are optimization of the overall network capacity or optimization of the perceived performance (at least for selected services or user groups). To achieve this, users need to be moved between the available radio networks, in so called Intra Radio Access Technology Handovers (IRAT HOs), where so called Directed Retry is a special case, when handover is performed prior to allocation of a traffic channel.

One known solution for optimization of the overall network capacity or optimization of the perceived performance is setting up the requested service(s) in the current RAT, during service evaluating the potential candidate cells and, if a better candidate RAT/cell is found, moving the "call(s)" to a more suitable RAT/cell. This solution has the disadvantage that all services need to be designed in all RATs and packet switched protocols will perceive an interruption which is longer than minimum. Thus, the packet switched protocols will not reach their highest throughput.

Another known solution is to evaluate potential candidate RAT/cells already at the service request and, if the call should be allocated to another RAT/cell, immediately set up the call in the target RAT/cell. However, this has the drawback that accurate measurements on candidate RAT/cells may delay the call setup several seconds. If a short measurement period is used instead, there may be a significant risk that the assignment fails.

User equipment, such as mobile terminals, is known to base, in order to provide better accuracy, initial measurements at call setup on measurements made previously in an idle mode. Thereby, so called "smart re-use" of the previous measurements can be used, but nevertheless, the previous measurements are typically relatively inaccurate due to long sleep periods (DRX cycles).

In UTRAN, there is a possibility to utilize a so called compressed mode for service setups and connections, in order to increase the service capabilities of a network. However, there is often in UTRAN an upper limit for the compressed mode traffic fraction in a network node. Hence, it is undesirable to activate the compressed mode at all call setups. The consequence is that the compressed mode is activated only when the desired service is known, so that there is no decrease of the traffic load contribution of a service setup before the type of service requested is known by the network.

In order to reduce the interruption of initial signaling by measurements, it has been suggested to provide a separate measuring receiver in mobile terminals. However, this will make it larger and more complex, power consuming and expensive.

SUMMARY

It is an object of the present invention to reduce the call setup delay in mobile communication systems.

It is also an object of the present invention to improve the measurement accuracy of a mobile communication device.

These objects are reached with a method for mobile communications, comprising the step of sending a service request from a mobile communication device to a mobile communications network, wherein the following steps are carried out before sending the service request: detecting an activity related to a mobile communication device, and performing, in response to the detection of the activity, at least one measurement of at least one candidate for serving a communication session.

The service request sent from the mobile communication device to the mobile communications network could be any kind of service request made in connection to a service setup procedure and used in any standard, such as UTRAN or GPRS. The at least one candidate to which the at least one measurement relates to could be a cell or base station of a cellular mobile communication network and/or a radio access technology (RAT). The at least one measurement is performed on at least one candidate for serving a communication session, which is related to and/or is dependent upon the service request.

The invention takes advantage of the fact that, before the service request, for example in the form of an initial service setup request, is sent to the network, usually some kind of activity related to the mobile communication device takes place. For example, as will be explained closer below, this activity could involve the device and be performed by a user of the device when he or she wants to make a call, or the activity could be a so called page when the device receives a call. The time period between the activity and the service setup procedure is used to acquire information needed by the network, i.e. measurement results regarding communication session candidates.

Utilising the time period, between the detection of the device related activity and the service request at service setup, to gather information, in the form of at least one candidate measurement needed by the radio network, will improve the performance of controlling the traffic at originating and terminating service (e.g. call) setup procedures by providing more accurate measurement information in a shorter time to the radio networks. The increased measurement information can be used to increase the service (e.g. call) setup success rate or shorten the service setup time, with insignificant increase in mobile communication device battery drain.

Since service setups are often preceded by some kind of activity, such as a user activity, for example push-button maneuvers or telephone number dialling, and such an activity is detected, and at least one measurement of at least one candidate for serving a communication session is performed in response to said detection, fresh, and therefore accurate measurements for the service setup procedure are provided. Therefore, accurate measurements can be used to improve traffic control at service setup, which reduces the need of starting in a suboptimal RAT/cell.

Also, performing measurements before service setup procedures but in response to an activity of said kind means that the measurements will occur at a time close to the time of service setup, but the time of measurement will precede the time of service (e.g. call) setup and not overlapping it. Thereby, it is secured that the measurement will not delay a service setup. The time separation of measurements and service setups will eliminate the need for a separate measuring receiver in the mobile communication device, (see the section "Background" above). Also, in a UTRAN application, the invention greatly reduces the need to support a high fraction of calls utilizing a compressed mode, (see the section "Background" above).

If the mobile communication device makes relatively infrequent measurements in an idle mode, the at least one measurement, performed in response to the detection of the activity, could be more frequent neighbour RAT/cell measurements. Such frequent measurements could be similar to what a mobile communication device performs in known solutions at a later stage (SRB/SDCCH or "traffic channel"), e.g. twice per second applying some filter.

Preferably, the following step is carried out before sending the service request: sending, from the mobile communication device to the mobile communications network, at least one result relating at least partly to the at least one measurement.

Sending the result(s) of the measurement(s) of the candidate(s) in response to detecting an activity related to the mobile communication device, but before sending a service setup connected request from the device to the network means that the measurement result(s) will be sent at a time close to the time of service setup, but the time of sending the result(s) will precede the time of service (e.g. call) setup and not overlapping it. Thereby, it is secured that sending the result(s) will not delay a service setup. This has many advantages. Most importantly, it will increase the speed of service setup procedures, since they are not "interfered" by the sending measurement result(s). Also, this further decreases the need for UTRAN base stations to support a high fraction of calls utilizing a compressed mode.

Also, sending the measurement results in said time frame will in most cases cause only a marginal increase of mobile communication device battery drain, since the device related activity usually will cause power consuming functions, such as display illumination at user entries.

Preferably, the step of performing at least one measurement is dependent on strategy information sent from the mobile communications network to the mobile communication device. More specifically, such strategy information can contain at least one rule relating to candidate measurements performed by mobile communication devices in certain cells of a mobile communications system, and in response to an activity relating to the mobile communication device. The strategy information is preferably sent by broadcasting. Thus, for example measurement filter parameters and/or the trigger conditions, such as user activity(ies) to be detected as triggering measurements, can be configured by the network. More generally, the strategy information can include, apart from at least one rule for the manner in which the measurements are carried out, rules for detecting an activity related to the mobile communication device, and/or at least one rule for sending the at least one measurement result.

Preferably, quality information relating to the at least one measurement is sent after the step of detecting an activity, and before the step of sending a service request. The quality information can be sent in any suitable form, for example as a "flag" with the measurement results. The quality information can relate to any important condition of the measurements, for example the number of samples obtained from the beginning of the measurements triggered by an activity related to the mobile communication device, and/or the whether the device was able to finalize complete measurements before sending them. The quality information gives the network has a way to determine the level of accuracy of the measurement results. At least one rule relating to the setup of such quality information can be included in the strategy information described above.

Preferably, the detected activity is such that it is an activity typically associated with a setup of a network provided service. In one embodiment, the detected activity is a user activity such as at least one maneuver of a user control device. As an alternative or a complement to user activities, the detected activity triggering the measurement(s) is related to a signal received by the mobile communication device. For example, the activity could be a so called page when the device receives a call.

In general, the activity to be detected could involve an event, or a sequence of events, which are highly correlated with a start of a "call", or other network provided service, e.g. opening a stored phone book. By distinguishing such user activities from "non-call" related activities, for example user activities related to an electronic calendar in the device, unnecessary battery drain caused by not-required measurements can be avoided. Thus, activities not related to a network provided service do not trigger any measurement.

In case the detected activity is a maneuver of a user control device, the latter could be a push-button, a miniature joystick, or a touch sensitive screen of the mobile communication device. This provides for the possibility of easily integrating the detection function of a user activity into available designs, since no separate additional hardware is needed for the detection. Also, this concept does not have any significant "cost" in terms of battery drain, since the measurement trigger is chosen at a time when the mobile communication device is "awake" due to the user activity, e.g. the processor runs and the display is lit.

The detected activity could correspond to a predefined activity. A plurality of predefined activities could be stored in the mobile communication device. Such predefined activities could comprise the user opening a phonebook, a bookmark book or similar. The predefined activities could also comprise at least a part of an entry of a phone number. For example, a user could in a traditional way initiate a call setup procedure by pushing a sequence of numbers of a telephone number by using number buttons on the mobile communication device. Thereby, the device could be adapted to perform the measurement in response to the first press action made by the user. To distinguish the first press action of such a sequence from other press actions in the sequence, the measurement step could be subject to a condition that a number button is pressed after a time interval being longer than a minimum predetermined time interval. The predetermined time interval should be longer than a time interval typically lapsing between two number button press actions when a phone number is dialed.

Further alternatives are possible concerning the user activity to be detected. In a case where the mobile communication device is a so called connection card, adapted to the joined with a portable computer, or similar, for wireless network connections, the user activity to be detected could be the portable computer being switched on, or the computer starts to enter AT-commands. Alternatively, the user activity to be detected could be the portable computer starting to run a web browser software program.

If the mobile communication device comprises a foldable part, for example provided with a keypad, the user activity to be detected could be swinging the foldable part to a position normally assumed when the user wants a service, e.g. make a call.

The user activity to be detected could also be an activity involving connecting the mobile communication device to another device, via a connecting plug, for example of a type combined with the USB—(Universal Serial Bus)-standard.

Also, the mobile communication device could be provided with an acceleration sensor or similar, and be adapted to detect movement or acceleration values being larger than a predetermined threshold value. The threshold value could be adapted so that it is higher than values normally obtained during non-use of the terminal, for example, when the terminal is stored in a pocket or a bag of the user. Additionally, the threshold value could be adapted so that detection is made when the terminal is actually handled by a user, i.e. in a hand of the user, during which the movements are usually more rapid than otherwise.

Other possible user activities to the detected as triggering the measurement could be the detection of a user voice command, an application started by the user (e.g. a voice call or a video call. Another possible user activity to the detected could be related to location and speed information from a terminal positioning system (GPS).

DESCRIPTION OF THE FIGURES

Below, embodiments of the invention will be described in detail with reference to the drawings, in which.

DETAILED DESCRIPTION

Figure 1:
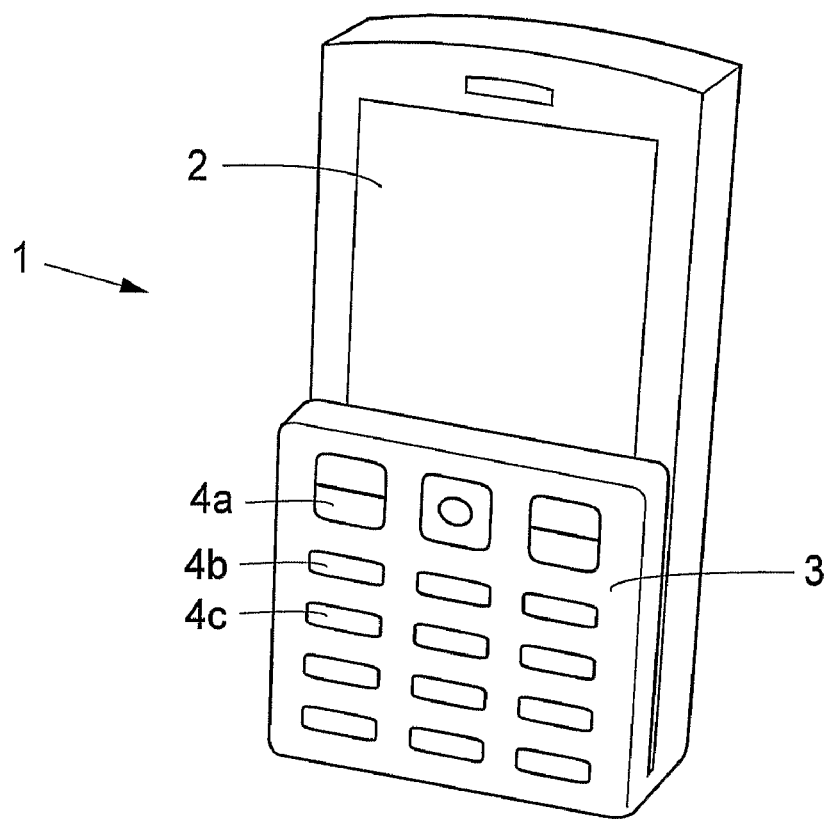
FIG. 1 is a perspective view of a mobile communication device.

FIG. 1 shows user equipment 1, herein also referred to as a mobile communication device 1, in the form of a mobile terminal 1, provided with user control devices in the form of a display 2 with a touch sensitive screen and a keypad comprising a plurality of keys 4a, 4b, 4c provided on a foldable part 3. While FIG. 1 shows one example of a mobile communication device, it should be noted that the invention is applicable to a large variety of mobile communication devices, for example mobile terminals, MS/UE:s (mobile stations/user equipments) or connection cards, adapted to the joined with a portable computer, or similar, for wireless network connections.

Figure 2:
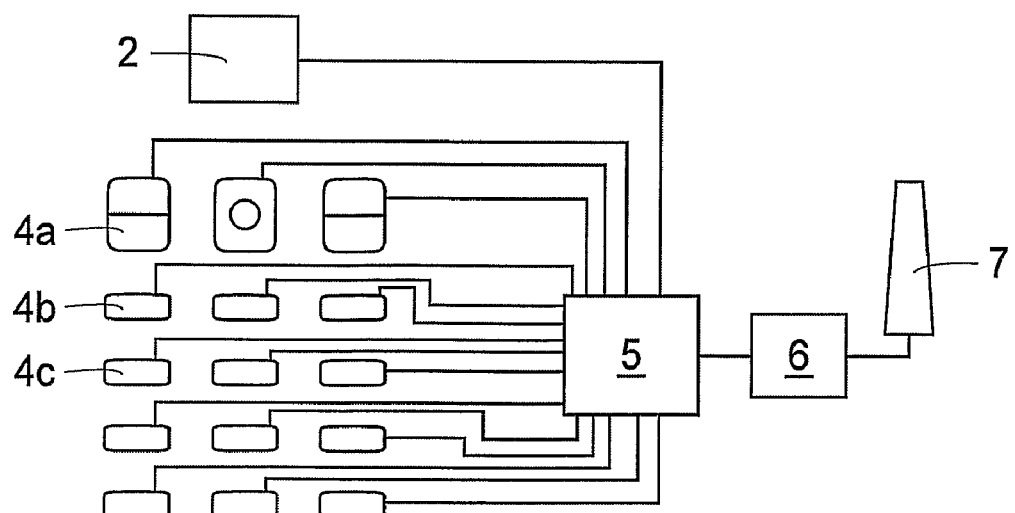
FIG. 2 is a schematic view of parts of the mobile communication device in FIG. 1.

As can be seen in FIG. 2, the display 2 and each of the keys 4a, 4b, 4c are connected to a processing unit 5 of the mobile communication device 1. The processing unit 5 is connected to radio electronic circuits 6, in turn connected to an antenna 7 of the mobile communication device 1.

Figure 3:
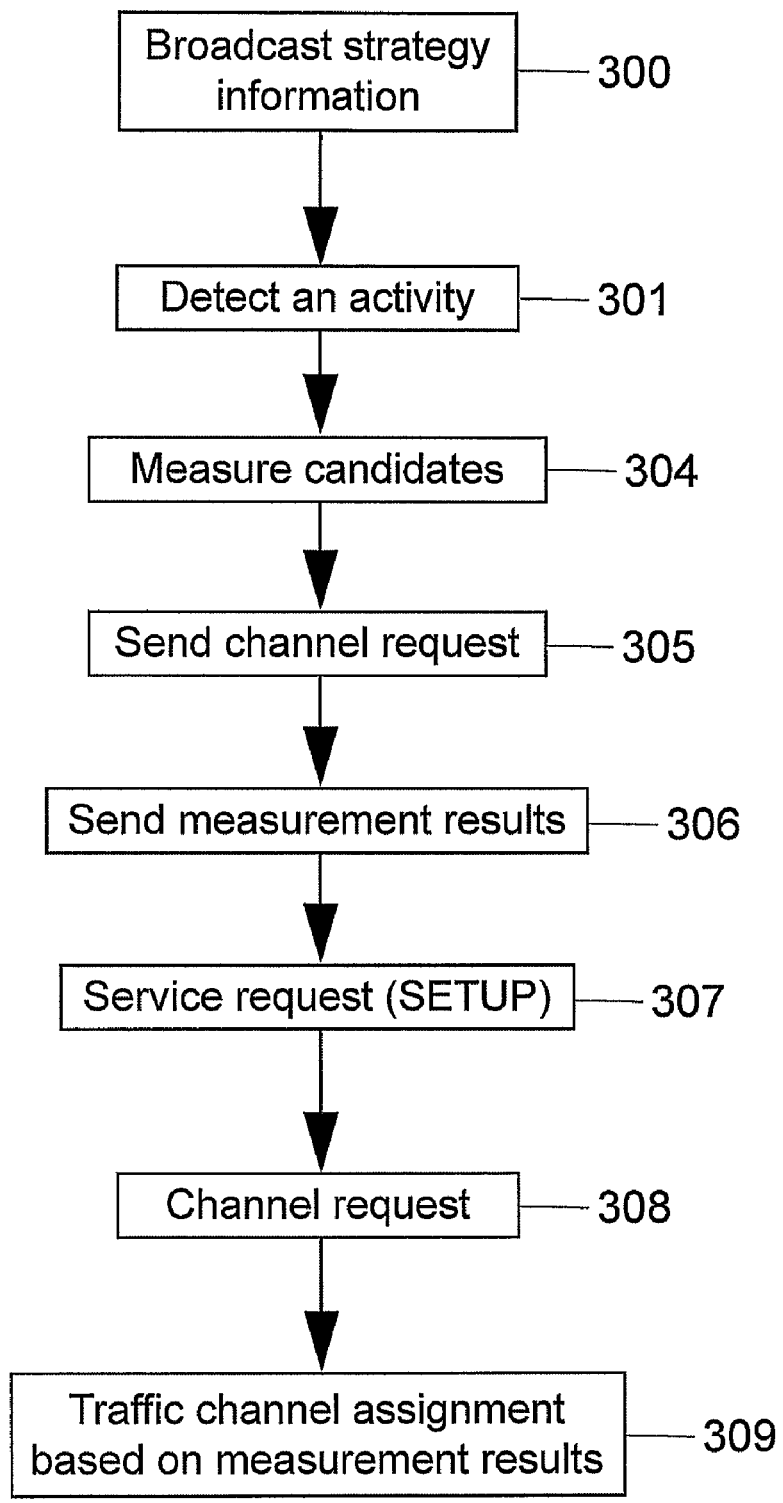
FIG. 3 is a block diagram of steps in a method according to one embodiment of the invention.
Figure 4:
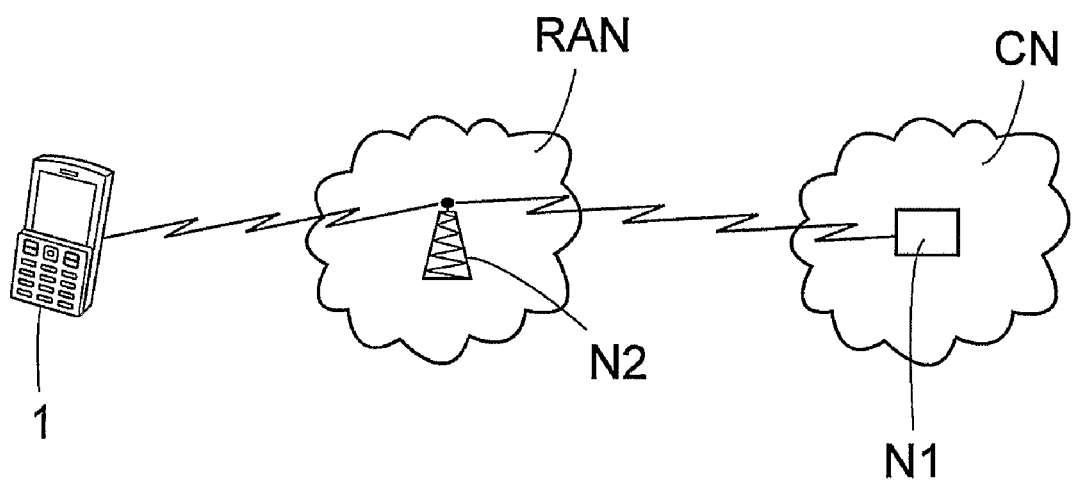
FIG. 4 shows schematically parts of a mobile communication system.

Referring to FIG. 3 and FIG. 4, a method according to one embodiment of the invention will be described. A service providing network comprises a core network CN and a radio access network RAN. A control node N1 in the core network CN is adapted to send strategy information to at least one access node N2 in the radio access network RAN. The at least one access node N2 in the radio access network RAN is adapted to broadcast 300 the strategy information to a plurality of mobile communication devices, (only one device shown in FIG. 4). The broadcasting could be performed in one or more predetermined cells of the network. In a UTRAN-application, the control node N1 could be a radio network controller RNC, which sends the strategy information to the access node N2 in the form of a Node B, which in turn makes repeated broadcast transmissions including the strategy information. In a GERAN-application, the control node N1 could be a unit for broadcast control (BC), and the access node N2 a Base Tranceiver Station (BTS).

The strategy information comprises at least one rule for at least one step described below, such as measurement configuration to be used upon detecting an activity related to the mobile communication device, and/or rule(s) for sending at least one measurement result. The strategy information is stored in the mobile communication device 1. The method comprises detection 301 by the processing unit 5 of an activity related to the mobile communication device. When the detection takes place, the mobile communication device 1 could be in idle mode. The activity could be a user activity, for example a pressing action on one of the keys 4a, 4b, 4c, a manipulation of the touch sensitive screen of the display 2, or some other activity related to a network provided service, and described above in the section "Summary". The detected activity is one of several predefined activities, stored and accessible to the processing unit 5, and which predefined activities relates to activities typically associated with a network provided service setup procedure. However, instead of identifying activities typically associated with a network provided service setup procedure, in an alternative embodiment, any activity related to the mobile communication device can be detected. The activities to be detected in the method according to the invention could be locally defined and prestored in the mobile communication device, or by the network, at which it can be included in the strategy information described above.

In response to the detected activity, measurements 304 of communication session candidates, i.e. neighbour RATs and/or cells, are carried out by means of the radio electronic circuits 6 and the antenna 7. The candidates can be included in a list of cells, which is included in the strategy information, and/or constitute cells, which the mobile communication device 1 detects autonomously. The measurements can be periodic with a shorter period than periodic measurements performed according to known art in an idle mode of the device 1, before the activity was detected.

Thereafter, a channel request is sent 305 from the mobile communication device 1 to the RAN. Subsequently, the results of the measurements are sent 306 from the mobile communication device 1 to the RAN. This could be done simultaneously to traditional security procedures between the mobile communication device 1 and the RAN.

Preferably, in connection to sending results of measurements, quality information relating to the at least one measurement is sent from the device 1 to the RAN. From the quality information, the network can determine the strategy on which the measurements were made and/or whether the measurements were completed.

When the measurement results have been sent, and security procedures have been carried out, a service request is sent 307 from the mobile communication device 1 to the CN, a step referred to as SETUP in the art. Thus, since the measurement results have already been sent 306 when the service request is sent 307, acquiring the measurement results 306 will not delay further service setup procedures.

After a service request is sent 307, a channel request (e.g. a Channel/PFC/RAB Request) is sent 308 from the CN to the RAN. Subsequently, a traffic channel assignment is made 309 between the mobile communication device 1 and the RAN, at least partly based on the measurement results previously sent to the RAN. Thus, a connection for transferal of user data is thereafter established between the mobile communication device 1 and the CN.

Alternatives are possible for the tuning of the transmittance 306 of measurement results. In general, the measurement results should be sent as "late as possible", to enable accurate results, but sufficiently early to allow direct setup to a suitable target cell. However, according to the invention, transmittance 306 of the measurement results are completed when the SETUP stage 307 is carried out, so that sending the measurement results 306 will not interfere with the SETUP stage 307. Also, since measurement results are already obtained by the RAN when the channel request 308 (usually following essentially immediately upon the SETUP stage 307) is made, the RAN will know, without delay, if a more suitable RAT/cell is available.

In certain applications, for example in a case of SCUDIF (Service Change and Fallback for UDI64 (3GPP Work Item)), the SETUP stage 307 includes two alternative requests from the mobile communication device 1 to the CN, e.g. one request for voice telephony and another for video telephony. Thereby, the measurement results are sent 306 before both of the requests.

Preferably, the mobile communication device 1 is adapted to allow a predetermined time interval to lapse before any further measurement is performed, in case the activity that has triggered a measurement never leads to a service setup. Such a timeout could be fixed or set by the user and/or broadcast by the network.

The invention claimed is:

1. A method for mobile communications, comprising the step of sending a service request from a mobile communication device to a mobile communications network, wherein the following steps are carried out before sending the service request:
   the mobile communication device detecting a call-related event that is associated with a setup of a network-provided service and that requires the sending of the service request to the mobile communications network for the setup of the network-provided service;
   the mobile communication device performing, only in response to the detection of the call-related event, at least one signal-quality measurement of a candidate for serving a communication session, wherein the candidate includes at least one of a Radio Access Technology (RAT) and a cell of the mobile communications network; and
   the mobile communication device sending to the mobile communications network a result relating to the at least one signal-quality measurement,
   wherein the mobile communication device performs the at least one signal-quality measurement and sends the result only in response to the call-related event and only during a time period between detection of the call-related event and the sending of the service request.

2. The method according to claim 1, wherein the step of performing at least one signal-quality measurement is dependent on strategy information sent from the mobile communications network to the mobile communication device.

3. The method according to claim 1, wherein the call-related event is a user activity.

4. The method according to claim 3, wherein the user activity is at least one maneuvering of a user control device.

5. The method according to claim 4, wherein the user control device is a push-button, a miniature joystick, or a touch sensitive screen of the mobile communication device.

6. The method according to claim 1, wherein the detected call-related event corresponds to a predefined activity.

7. The method according to claim 6, wherein the predefined activity is opening a phonebook or a bookmark book stored in the mobile communication device, or at least a part of an entry of a phone number.

8. The method according to claim 1, wherein the call-related event is related to a signal received by the mobile communication device.

9. A mobile communication device comprising a processor configured to send a service request to a mobile communications network, wherein the mobile communication is configured to perform the following prior to sending the service request:
   detect a call-related event that is associated with a setup of a network-provided service and that requires the sending of the service request to the mobile communications network for the setup of the network-provided service;
   only in response to the detection of the call-related event, perform at least on signal-quality measurement of a candidate for serving a communication session, wherein the candidate includes at least one of a Radio Access Technology (RAT) and a cell of the mobile communications network; and
   send to the mobile communications network a result relating to the at least one signal-quality measurement,
   wherein the mobile communication device is configured to perform the at least one signal-quality measurement and send the result only in response to the call-related event and only during a time period between detection of the call-related event and the sending of the service request.

10. The mobile communication device according to claim 9, further configured to receive and store strategy information sent from the mobile communications network, and configured to perform said signal-quality measurement in dependence on the strategy information.

11. The mobile communication device according to claim 9, wherein the call-related event is a user activity, and wherein the mobile communication device is further adapted to detect the user activity.

12. The mobile communication device according to claim 11, wherein the user activity is at least one maneuvering of a user control device.

13. The mobile communication device according to claim 12, wherein the user control device is a push-button, a miniature joystick, or a touch sensitive screen of the mobile communication device.

14. The mobile communication device according to claim 9, wherein the call-related event is a predefined activity and wherein the mobile communication device is further configured to detect the predefined activity.

15. The mobile communication device according to claim 14, wherein the predefined activity is opening a phonebook or a bookmark book stored in the device, or at least a part of an entry of a phone number.

16. The mobile communication device according to claim 9, wherein the call-related event is related to a signal received by the mobile communication device, and wherein the mobile communication device is further configured to detect the signal received by the device.

* * * * *

UNITED STATES PATENT AND TRADEMARK OFFICE
CERTIFICATE OF CORRECTION

| | | |
|---|---|---|
| PATENT NO. | : 8,213,944 B2 | |
| APPLICATION NO. | : 12/161654 | |
| DATED | : July 3, 2012 | |
| INVENTOR(S) | : Hedberg | |

It is certified that error appears in the above-identified patent and that said Letters Patent is hereby corrected as shown below:

In Column 7, Line 7, delete "tuning" and insert -- timing --, therefor.

Signed and Sealed this
Twenty-seventh Day of November, 2012

David J. Kappos
*Director of the United States Patent and Trademark Office*